(No Model.) 2 Sheets—Sheet 1.

F. H. HAMBLETON.
APPARATUS FOR MEASURING AND CARBURETING AIR OR GAS.

No. 429,271. Patented June 3, 1890.

WITNESSES:
C. Raymond Weaver
Robt. A. Taylor

INVENTOR
Francis H. Hambleton
BY
Price & Stuart
ATTORNEYS (No Model.) 2 Sheets—Sheet 2.

F. H. HAMBLETON.
APPARATUS FOR MEASURING AND CARBURETING AIR OR GAS.

No. 429,271. Patented June 3, 1890.

100 TEETH  99 TEETH  98 TEETH

WITNESSES:
C. Raymond Weaver
Robt. A. Taylor

INVENTOR
Francis H. Hambleton
BY
Price Stewart
ATTORNEYS

THE NORRIS PETERS CO., PHOTO-LITHO., WASHINGTON, D. C.

UNITED STATES PATENT OFFICE.

FRANCIS H. HAMBLETON, OF BALTIMORE, MARYLAND.

APPARATUS FOR MEASURING AND CARBURETING AIR OR GAS.

SPECIFICATION forming part of Letters Patent No. 429,271, dated June 3, 1890.

Application filed January 14, 1889. Serial No. 296,252. (No model.)

*To all whom it may concern:*

Be it known that I, FRANCIS H. HAMBLETON, of the city of Baltimore and State of Maryland, have invented certain new and useful Improvements in Apparatus for Measuring and Carbureting Air or Gas, of which the following is a specification.

The method of measuring and carbureting gas at the place of manufacture as now generally in use is by trial an error—that is to say, by practically testing from time to time the proportions of gas and hydrocarbon and setting the faucet accordingly. By this method there is neither accuracy nor regularity. By my method these tests are avoided, and I provide an automatic and co-operative method of indicating and recording the exact proportions of gas and hydrocarbon, which may be ascertained by an unskilled operator simply by inspection, and means for varying these proportions, which may be readily applied to produce the exact proportions required.

The following description, illustrated by the accompanying drawings, shows an apparatus as applied to the ordinary street-gas.

Figure 2:
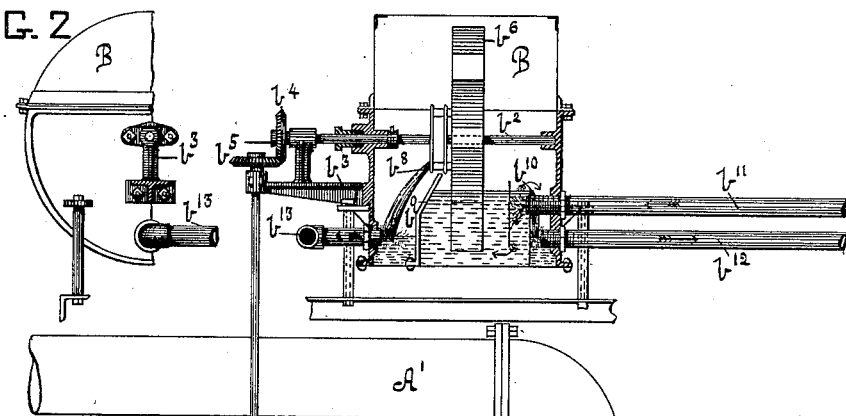
Figure 1:
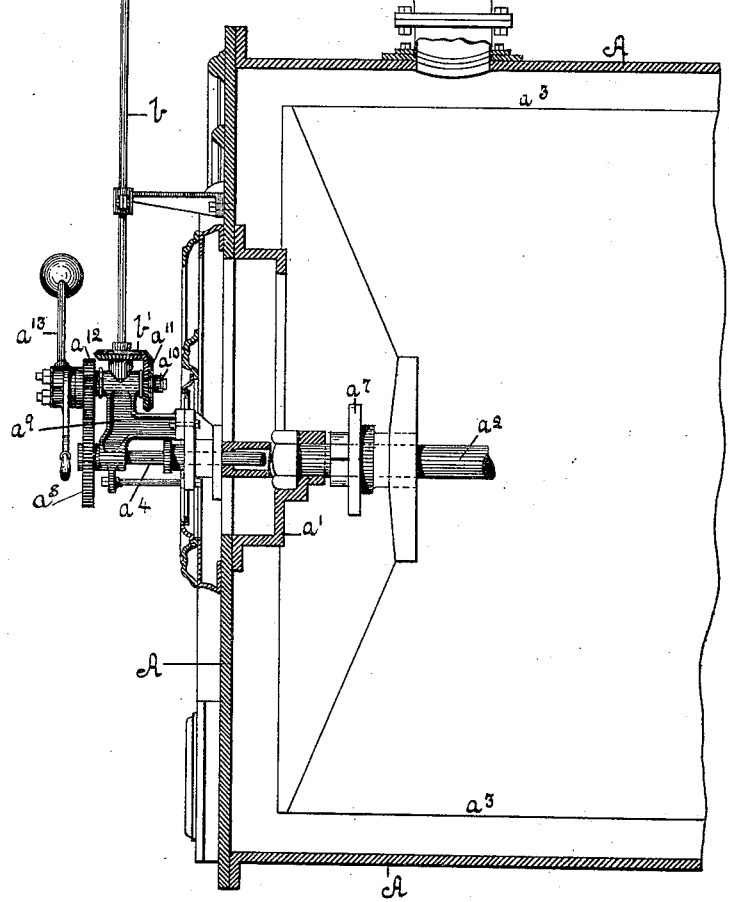
Figure 5:
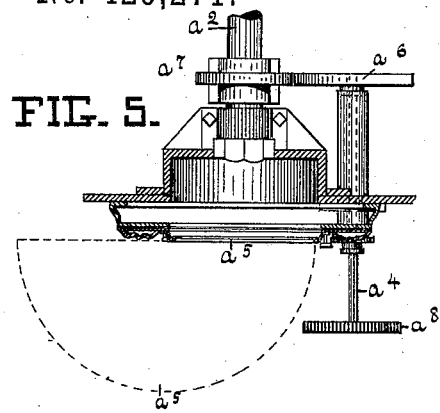
Figure 4:
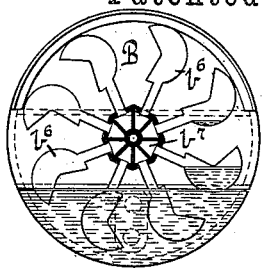
Figure 6:
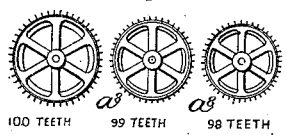
Figure 3:
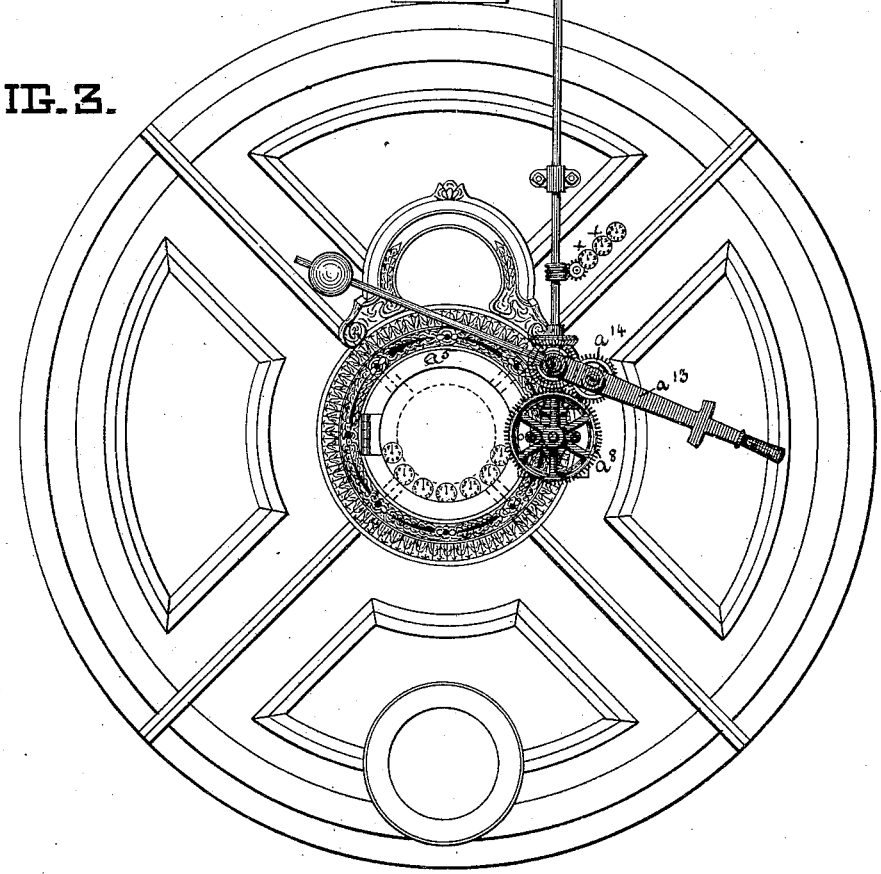

Figure 1 is a view of the gas-meter with the cylinder shown in section, giving a view of the interior revolving drum actuated by the gas. The shaft upon which the drum is mounted is connected by gearing to the upright shaft which operates the buckets or dippers in the hydrocarbon-meter. It also shows the meter and the pipe (broken away) which leads to the mixing-chamber. Fig. 2 is an end view (broken away) of the hydrocarbon-meter, showing bracket which supports the gearing and the pipe leading to mixing-chamber; Fig. 3, an end view of the gas-meter furnished with a dial, also showing the outside gearing which revolves the dippers in the hydrocarbon-meter and the end of the pipe leading from the gas-meter to the mixing-chamber. This figure also shows a series of dials for marking the quantity of hydrocarbon. Fig. 4 is an end section of the hydrocarbon-meter, showing the revolving buckets or dippers; Fig. 5, a side view of the meter-dial provided with a front door, and a view of the shaft which receives motion from the meter and imparts it to the upright shaft which works the revolving buckets in the hydrocarbon-receiver. Fig. 6 shows several wheels of varying number of teeth intended to be substituted for the wheel $a^8$ to vary the proportions of hydrocarbon to enrich the gas as required.

Viewing Fig. 1, A is the outer casing of the gas-meter cylinder, broken away and shown in section; $a'$, a bracket within the cylinder to support the shaft $a^2$. Upon this shaft is mounted the drum $a^3$. The drum $a^3$ is revolved by the passage of gas through the cylinder and marks the number of cubic feet of gas passing through the meter upon the dial. (Shown in Fig. 3.) The revolving drum and dial of gas-meters are well known and understood, and require no special explanation. Located at one side of the shaft $a^2$ and supported by the head of the cylinder is journaled the shaft $a^4$, far enough removed from the center of the cylinder to escape the door $a^5$ when opening or closing. Upon one end of the shaft $a^4$ is secured the wheel $a^6$, (see Fig. 5,) which meshes with the wheel $a^7$, secured to the shaft $a^2$. This latter wheel imparts revolution to the shaft $a^4$, which has secured to its opposite end the wheel $a^8$. Upon a bracket $a^9$, secured to the head of the cylinder, is journaled the shaft $a^{10}$, which carries the bevel-wheel $a^{11}$. The shaft extends through the bracket, and upon its other end are secured the wheel $a^{12}$ and lever $a^{13}$. Upon this lever is also pivoted the wheel $a^{14}$, which meshes with the wheel $a^{12}$, and as the lever is pivoted centrally with that wheel and with the shaft $a^{10}$ it may be moved up or down without affecting the wheel $a^{12}$ or its position with the wheel $a^{14}$. This latter wheel meshes with the wheel $a^8$ when the lever is down, thus imparting revolution to the shaft $a^{10}$. The object of this arrangement is to change the wheel $a^8$ and substitute therefor one of a different number of teeth, so that a relatively faster or slower motion may be given to the shaft $a^{10}$ at the will of the operator. An offset in the bracket $a^9$ serves to support the end of the upright shaft $b$, to which is secured the bevel-wheel $b'$, which meshes with the wheel $a^{11}$.

B is the hydrocarbon-meter, through which runs the shaft $b^2$, journaled in the heads of the case of the meter. Passing out of one end, it is journaled in the bracket $b^3$, and carries on its end the bevel-wheel $b^4$, meshing with the wheel $b^5$ on the end of shaft $b$. Upon the shaft $b^2$ is secured the bucket-wheel provided with the buckets or dippers $b^6$. These buckets are provided with stems which are inserted into the hollow hub $b^7$. This hub has a discharge-outlet, (shown at $b^8$.)

The meter B is divided into compartments by the partition-walls $b^9$ and $b^{10}$, the partition $b^9$ being higher than $b^{10}$, so as to retain the hydrocarbon and allow it to overflow the partition $b^{10}$.

$b^{11}$ is the inlet-pipe, which conducts the hydrocarbon from a receptacle (not shown in the drawings) and discharges it into the carburetor. The supply is regulated to be greater than the demand, so that the liquid will be kept always on a level with the partition $b^{10}$ and the surplus allowed to overflow and be drained off through the pipe $b^{12}$. As the buckets $b^6$ revolve they dip up the required quantity of the liquid, which runs into the adjoining compartment through the discharge $b^8$, and thence out of the pipe $b^{13}$ to the mixing-chamber or carburetor, (not shown in the drawings,) where it meets the gas discharged into the same chamber through the pipe A', and from thence to the benches, (not shown in the drawings,) where it is fixed at the required rate.

The operation of the device is as follows: The air or gas passing through the meter revolves the drum $a^3$, which indicates upon the dial the number of cubic feet of air or gas passing through the meter. The wheel $a^3$ in its turn revolves the bucket-wheel in the hydrocarbon-meter through the mechanism already described. As the revolution of the drum $a^3$ is increased by a greater quantity of gas passing through the meter and measured thereby, there is a corresponding increase in the revolutions of the hydrocarbon-meter and an increase in the supply of hydrocarbon, thereby maintaining the supply of hydrocarbon in proportion to the gas which is measured and indicated by the dials $x$ $x$. Should other means be used to aid the air or gas in turning the drum $a^3$ faster than by the ordinary flow of the air or gas, an increased quantity of gas would pass through the meter, and consequently an increased supply of hydrocarbon would be measured out and indicated by the dials. In either case the gas passing through the meter would ascertain the supply of hydrocarbon. In the manufacture of carbureted water-gas, for example, it is sometimes desirable to make it more or less rich in carbon. It is therefore necessary to have connected with the apparatus some means by which it can be readily adapted for changing the proportion of hydrocarbon to the quantity of gas. This is effected by the following mechanism:

Viewing Fig. 3, the wheel $a^8$ is of a size to regulate the supply of hydrocarbon according to a given rate, and, as shown in the drawings, is about the largest size used. It meshes with the wheel $a^{14}$, pivoted to the lever, which in its turn meshes with the wheel $a^{12}$, which latter wheel is secured to the same shaft as the bevel-wheel $a^{11}$. It will be seen that as the wheel $a^{14}$ has its center a fixed distance from the wheel $a^{12}$ the lever may be raised or lowered any distance without affecting these wheels. This enables me to change the wheel $a^8$ and substitute another of different size. As the diameter of this wheel is diminished the supply of hydrocarbon would also be diminished, and vice versa.

In the manufacture of carbureted water-gas for illuminating purposes it is impossible by the present methods of mixing the gas and hydrocarbon to arrive at any desired proportions of the two without trial and error, and when any desired proportion is reached only an approximate average running above and below the standard can be maintained, and this only by constant vigilance on the part of the operator. My invention provides an automatic method of producing and maintaining any desired standard of candle-power by even unskilled operators simply by inspection. To effect this control of the mixture, I employ an ordinary station-meter for measuring the gas and a specially-designed meter for measuring the hydrocarbon, in combination with a gearing device for making the two meters co-operate, so as to produce any desired mixture positively. For instance, if it is desired to mix six gallons of hydrocarbon to each thousand feet of water-gas, one of the series of wheels used on spindle 8 will be found marked for that proportion, and when placed in the spindle it will produce it exactly and maintain it for an indefinite time without alteration. At the same time the recording-dials of both meters will record the amount of material having passed through them respectively, so that by the operation of my invention the exact quantity of material used is controlled and registered automatically. Any proportion of gas and hydrocarbon can be produced exactly without trial. Any increase or diminution of candle-power can be produced instantly and accurately. In the manufacture of fuel gas the slight amount of carbureting necessary to produce the requisite odors can be produced and maintained exactly.

What I claim, and desire to secure by Letters Patent, is—

1. In an apparatus for manufacturing gas, the combination of two co-operative meters— one for measuring and recording the quantity of gas and the other for measuring and recording the quantity of hydrocarbon to be mixed therewith, and means for varying their relative proportions.

2. In an apparatus for manufacturing gas, the combination of a gas-meter and a hydrocarbon-meter, the latter actuated and controlled by the former by means of devices connected by suitable gearing, the wheels $a^8$ and $a^{12}$, and the lever $a^{13}$, pivoted on the shaft $a^{10}$ and carrying the wheel $a^{14}$, meshing with the wheel $a^{12}$ and also with the wheel $a^8$, and means for changing the wheel $a^8$ to vary the revolutions of the hydrocarbon-meter as required.

FRANCIS H. HAMBLETON.

Witnesses:
WALTER S. WILKINSON,
C. C. POULTNEY.